J. R. ROTH.
MEANS FOR SUPPORTING REAR AXLE ASSEMBLIES.
APPLICATION FILED NOV. 30, 1920.
1,420,386.
Patented June 20, 1922.
2 SHEETS—SHEET 1.
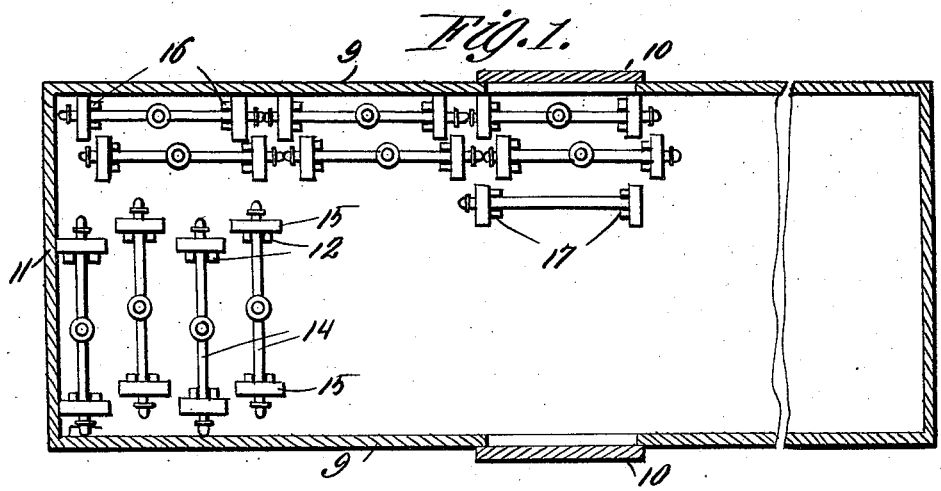
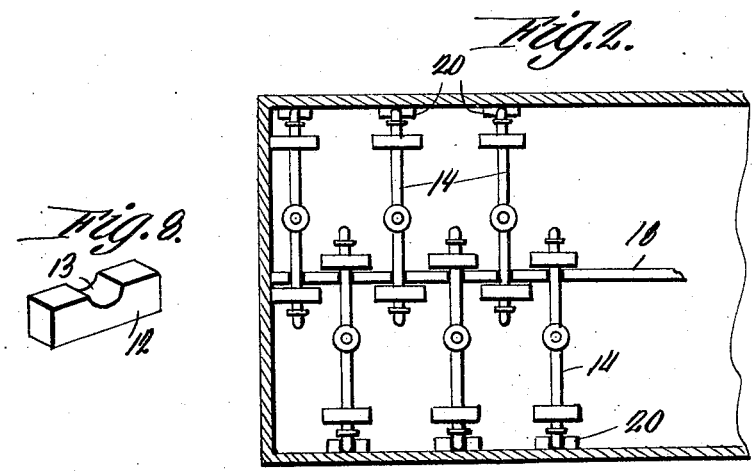
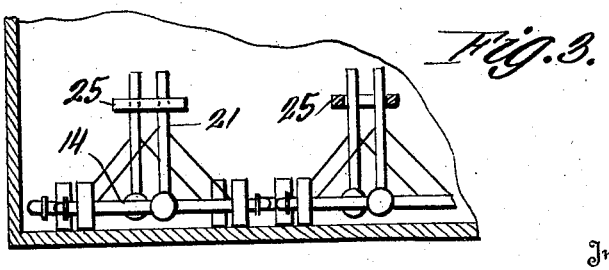
WITNESSES
Inventor
JOHN R. ROTH
By Richard B. Owen
Attorney

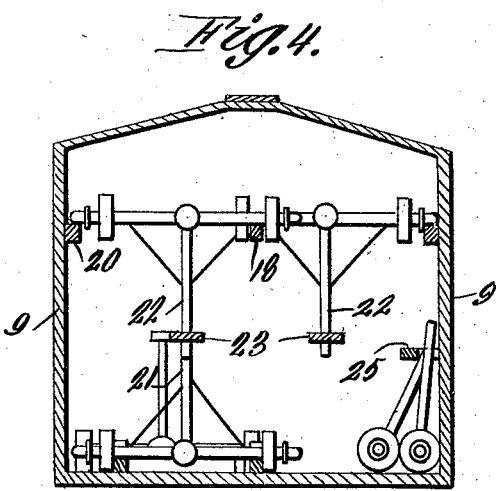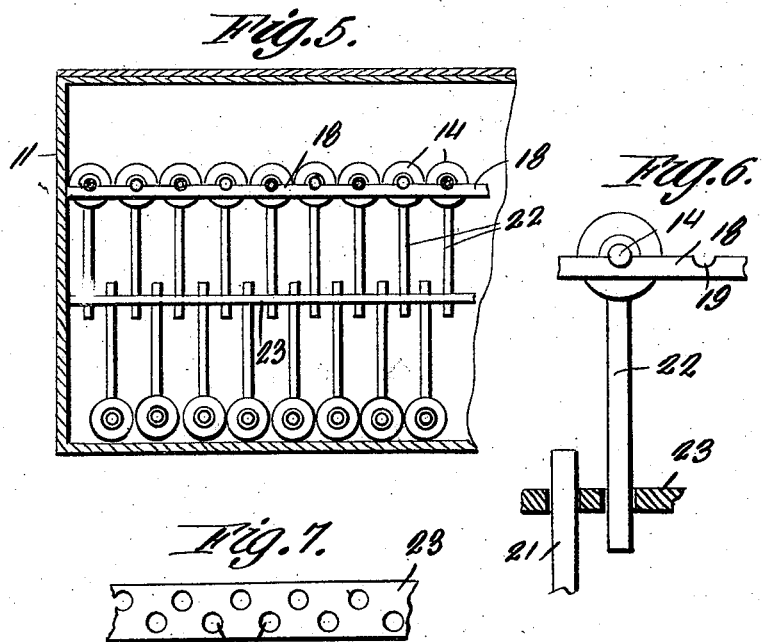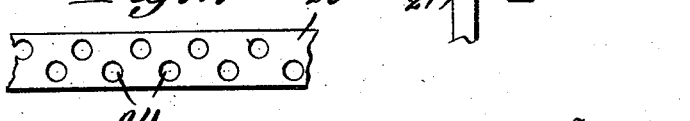

UNITED STATES PATENT OFFICE.

JOHN R. ROTH, OF FLINT, MICHIGAN.

MEANS FOR SUPPORTING REAR-AXLE ASSEMBLIES.

1,420,386.

Specification of Letters Patent. Patented June 20, 1922.

Application filed November 30, 1920. Serial No. 427,327.

*To all whom it may concern:*

Be it known that I, JOHN R. ROTH, a citizen of the United States, residing at Flint, in the county of Genesee and State of Michigan, have invented certain new and useful Improvements in Means for Supporting Rear-Axle Assemblies, of which the following is a specification.

This invention relates to improvements in means for supporting rear axle assemblies in freight cars during shipment and has for an object the provision of a crating structure whereby a greater number of rear axle assemblies may be packed into one car than has been possible by means heretofore known, the arrangement being such that the rear axle assemblies are easily packed and unpacked from the car.

Another object of the invention is to provide a structure whereby the rear axle and associated parts as well as the drive shaft are packed in spaced relation and are prevented from accidental movement thereby obviating the possibility of the axle assemblies knocking against each other during transportation to cause possible injury to each other.

Still another important object of the invention is to provide a structure whereby the rear axle assemblies may be packed one above the other or in oppositely disposed relationship whereby a common means may be employed for retaining the drive shaft in spaced relation.

Other objects and advantages of the invention will become apparent during the course of the following description.

In the accompanying drawings forming a part of the application and wherein like numerals are employed to designate like parts throughout the several views—

Figure 1 is a horizontal longitudinal section through a freight car showing my improved structure to support the rear axle assemblies.

Figure 2 is a similar view showing the upper row of axle assemblies.

Figure 3 is a fragmentary longitudinal section through the car showing the longitudinally arranged axle assemblies.

Figure 4 is a transverse section of the car.

Figure 5 is a fragmentary longitudinal vertical section through the car.

Figure 6 is an enlarged detail of a part of the invention.

Figure 7 is an elevation of another detail, and

Figure 8 is an enlarged perspective view of another detail of the invention.

In the accompanying drawings wherein for the purpose of illustration is shown the preferred embodiment of the invention, the numeral 9 designates the sides of a freight car having the usual doors 10 therein, while the numeral 11 designates the ends of the car. In the present embodiment of my invention, I contemplate using one row of supporting members 12 extending longitudinally along the floor of the car. These blocks are arranged in staggered pairs as clearly shown in Figure 1 and each member is equipped with a transversely extending groove 13 for the reception of the end of a rear axle assembly shown in its entirety by the numeral 14. It will be noted that the members of each pair are spaced apart so as to engage the rear axle housings inside of the brake drums 15 so as to preclude longitudinal movement of the rear axle assemblies. Of course, the staggered relation of the pairs of members 12 and consequently the rear axle assemblies permits of packing a greater number of assemblies in a given amount of space than when placed in alignment.

Instead of providing two similar rows upon the floor of the freight car and to facilitate unloading of the car, alongside of the longitudinally extending row of members or blocks 12, I provide transversely arranged supporting members 16 identical to the members 12. These members 16 are also arranged in pairs to receive rear axle assemblies in the same manner as the members 12. It is to be noted that the pairs of supporting members 16 in the second row are arranged slightly in advance and toward the center of the car to facilitate loading and unloading of the assemblies. It is also to be understood that the opposite end of the car is similarly arranged and equipped as just described, therefore a description for one end will suffice for both.

In the center of the car, I provide for a transverse row of assemblies and dispose this row in this position whereby it is readily accessible from either doorway of the car. The supporting members 17 are likewise arranged in pairs, staggered as clearly shown, it being understood that these members are the same as the supporting members 12.

As shown in Figures 2, 4 and 5, I provide for supporting rear axle assemblies above those on the bottom of the car by supporting a longitudinally extending member 18 centrally of the car in spaced relation to the bottom thereof. As is clearly shown in Figure 6, the upper surface of this member is provided with spaced notches 19 for the reception of the relative inner ends of rear axle assemblies forming the two longitudinally extending rows as clearly seen in Figure 2. Secured to the inner surfaces of opposite sides of the car and in the same plane with the member 18 are supporting members 20 identically the same in construction as those secured to the bottom of the car and are so arranged that when the relative outer ends of the rear axle assemblies are supported by these members 20 and their inner ends are supported by the supporting member 18, the two rows of rear axle assemblies are arranged in staggered relation, that is the brake drum of one is arranged between its two nearest rear axle assemblies.

By referring more particularly to Figure 4, it will be seen that the drive shaft casings 21 constituting parts of the rear axle assemblies arranged upon the floor of the car extend upwardly, while the drive shaft casings 22 of the rear axle assemblies arranged above those upon the floor extend downwardly. The drive shafts of the row of rear axle assemblies supported in the members 12, and the drive shafts of the assemblies forming one of the upper rows supported by the members 18 and 20, are engaged with an elongated member 23 so as to prevent accidental swinging movement of the assemblies. A similar member 23 is provided for engagement with the drive shafts of the upper row of assemblies. Each member 23 is equipped with a plurality of apertures 24 through which the drive shafts extend and by which they are retained in spaced relation.

The rear axle assemblies which are supported by the members 16 and arranged adjacent one side of the car are supported in a manner whereby their drive shafts extend upwardly and are retained in this position and against movement by extending through apertured members 25 secured to that side of the car. From the foregoing description, it will be obvious that a great many more rear axle assemblies may be packed in a freight car than has been accomplished heretofore, and that the assemblies are supported in spaced relation to obviate any possible damage thereto caused by swaying or vibration of the freight car during movement thereof.

The foregoing description and the accompanying drawings have reference to the preferred embodiment of my invention. It is to be understood however that such changes may be made in construction and arrangement of parts, materials, dimensions, etc., as may prove expedient and fall within the scope of the appended claims.

Having thus fully described my invention what I claim as new and desire to secure by Letters Patent is:—

1. A shipping structure for rear axle assemblies having means for supporting the same with the drive shaft casings thereof in substantially vertical positions.

2. A shipping structure for rear axle assemblies having means for supporting the same in a pair of rows with the drive shaft casings extending toward each other.

3. A shipping structure for rear axle assemblies having means for supporting the rear axle assemblies and means engaging the drive shaft casings thereof for supporting the same in spaced relation.

4. A shipping structure for rear axle assemblies having means for supporting the same, and an elongated member having apertures therein for the reception of the drive shaft casings forming parts of the rear axle assemblies.

5. A shipping structure for rear axle assemblies comprising spaced members for supporting the ends of the rear axle assemblies, and means for supporting the drive shaft casings thereof in spaced relation.

6. A shipping structure for rear axle assemblies of motor vehicles comprising a pair of supporting blocks adapted to engage faces of the brake drum on the ends of the assemblies to prevent lateral movement of the same.

7. A shipping structure for rear axle assemblies of automobiles having means for supporting the assemblies in a pair of rows with the drive shaft casings thereof extending toward each other and means disposed between the rows for bracing the shaft casings.

8. A shipping structure for rear axle assemblies of motor vehicles having means for supporting the same in a pair of rows with the drive shaft casings extending toward each other, and a bar disposed between the rows and having openings therein to receive and brace the shaft casings.

9. A shipping structure for rear axle assemblies of motor vehicles comprising supporting members arranged longitudinally of the structure and secured to the sides thereof, a notched bar extending between and parallel to said members whereby two rows of the assemblies are adapted to be supported upon said members and bar, the bar acting to support the proximate ends of the assemblies.

10. A shipping structure for rear axle assemblies having means for supporting the rear axle assemblies and means for preventing accidental movement of the drive shaft casings forming a part of the assemblies.

In testimony whereof I affix my signature in presence of two witnesses.

JOHN R. ROTH.

Witnesses:
   D. GOLDBERGER,
   N. MARSAND.